US010825576B2

(12) United States Patent
Di-Gianni et al.

(10) Patent No.: US 10,825,576 B2
(45) Date of Patent: Nov. 3, 2020

(54) APPARATUS FOR THE GENERATION, THE DISTRIBUTION AND/OR THE USAGE OF ELECTRICAL ENERGY AND COMPONENT FOR SUCH AN APPARATUS (71) Applicant: ABB Power Grids Switzerland AG, Baden (CH)

(72) Inventors: Anna Di-Gianni, Dättwil (CH); Bernhard vonAllmen, Zürich (CH); Denis Tehlar, Zürich (CH); Navid Mahdizadeh, Baden (CH); Thomas Alfred Paul, Wädenswil (CH)

(73) Assignee: ABB POWER GRIDS SWITZERLAND AG, Baden (CH)

( * ) Notice: Subject to any disclaimer, the term of this patent is extended or adjusted under 35 U.S.C. 154(b) by 958 days.

(21) Appl. No.: 15/092,405

(22) Filed: Apr. 6, 2016

(65) Prior Publication Data
US 2016/0225486 A1    Aug. 4, 2016

Related U.S. Application Data (63) Continuation of application No. PCT/EP2014/071274, filed on Oct. 3, 2014.

(30) Foreign Application Priority Data

Oct. 7, 2013  (WO) ............... PCT/EP2013/070843

(51) Int. Cl.
*H01B 3/56* (2006.01)
*H02B 1/48* (2006.01)
*H02B 1/28* (2006.01)
*H01B 17/36* (2006.01)
*H02B 13/055* (2006.01)
*H02B 13/035* (2006.01)

(52) U.S. Cl.
CPC ............... *H01B 3/56* (2013.01); *H01B 17/36* (2013.01); *H02B 1/28* (2013.01); *H02B 1/48* (2013.01); *H02B 13/035* (2013.01); *H02B 13/055* (2013.01)

(58) Field of Classification Search
None
See application file for complete search history.

(56) References Cited

U.S. PATENT DOCUMENTS

| 4,173,690 | A |   | 11/1979 | Giessner et al. |             |
|-----------|---|---|---------|-----------------|-------------|
| 4,933,060 | A | * | 6/1990  | Prohaska        | B29C 59/14  |
|           |   |   |         |                 | 204/192.36  |
| 5,592,024 | A | * | 1/1997  | Aoyama          | H01L 21/76801 |
|           |   |   |         |                 | 257/751     |
| 6,056,457 | A | * | 5/2000  | Chao            | G06F 3/0202 |
|           |   |   |         |                 | 400/472     |
| 7,811,860 | B2| * | 10/2010 | Mahler          | B05D 1/60   |
|           |   |   |         |                 | 257/702     |
| 2002/0081834 | A1 | * | 6/2002 | Daniels | H01L 21/76807 |
|           |   |   |         |                 | 438/624     |
| 2004/0220287 | A1 |   | 11/2004 | Champagne et al. | |
| 2011/0309715 | A1 | * | 12/2011 | Claessens | H01B 3/56 |
|           |   |   |         |                 | 310/273     |
| 2012/0145521 | A1 | * | 6/2012 | Glasmacher | H02B 13/055 |
|           |   |   |         |                 | 200/293     |
| 2013/0215555 | A1 | * | 8/2013 | Kieffel | H02B 13/055 |
|           |   |   |         |                 | 361/618     |
| 2014/0083737 | A1 | * | 3/2014 | Piccoz | H02B 13/055 |
|           |   |   |         |                 | 174/11 R    |
| 2014/0233159 | A1 | * | 8/2014 | Kieffel | H01H 33/22 |
|           |   |   |         |                 | 361/600     |
| 2014/0346143 | A1 | * | 11/2014 | Miyamoto | C09D 163/00 |
|           |   |   |         |                 | 218/1       |

FOREIGN PATENT DOCUMENTS

| CA | 2821218 A1   | 6/2012  |
|----|--------------|---------|
| CN | 201163710 Y  | 12/2008 |
| JP | S4898400 A   | 12/1973 |
| JP | S5176000 A   | 6/1976  |
| TW | 201340132 A  | 10/2013 |
| WO | 2012080222 A1| 6/2012  |

OTHER PUBLICATIONS

International Search Report and Written Opinion, PCT/EP2014/071274, ABB Technology AG, dated Nov. 6, 2014.

(Continued)

*Primary Examiner* — Katie L. Hammer
(74) *Attorney, Agent, or Firm* — Sage Patent Group (57) ABSTRACT

The present invention relates to an apparatus for the generation, the distribution and/or the usage of electrical energy. The apparatus comprises a housing enclosing an insulating space and an electrically conductive part arranged in the insulating space, said insulating space containing a dielectric insulation medium, at least a portion of which being in the form of an insulation gas comprising an organofluorine compound. According to the invention, at least some of the components of the apparatus that are directly exposed to the insulation gas are made of a material which remains unaltered during exposure to the insulation gas for a period of more than 1 year at operational conditions and/or have a surface, at least a portion of which is devoid of any nucleophilic group reactive towards the organofluorine compound and/or reactive towards any degradation product thereof at operational conditions.

30 Claims, 3 Drawing Sheets

(56) References Cited

OTHER PUBLICATIONS

International Preliminary Report on Patentabilty, PCT/EP2014/071274, ABB Technology AG, dated Jan. 18, 2016.
English translation of first Office Action in corresponding Chinese Application No. 201480055377.5; dated Mar. 1, 2017; 17 pgs.
English translation of second Office Action in corresponding Chinese Application No. 201480055377.5; dated as early as Jun. 30, 2017; 15 pgs.

* cited by examiner

APPARATUS FOR THE GENERATION, THE DISTRIBUTION AND/OR THE USAGE OF ELECTRICAL ENERGY AND COMPONENT FOR SUCH AN APPARATUS

The present invention relates to an apparatus for the generation, the distribution and/or the usage of electrical energy, to a component for such an apparatus, as well as to the process for the preparation of such a component.

Dielectric insulation media in liquid or gaseous state are conventionally applied for the insulation of an electrically conductive part in a wide variety of apparatuses, such as for example switchgears, gas-insulated substations (GIS), gas-insulated lines (GIL), transformers, or others.

In medium or high voltage metal-encapsulated switchgears, for example, the electrically conductive part is arranged in a gas-tight housing, which defines an insulating space, said insulation space comprising an insulation gas and separating the housing from the electrically conductive part without letting electrical current to pass through the insulation space. For interrupting the current in e.g. high voltage switchgears, the insulating gas further functions as an arc extinction gas.

Recently, the use of organofluorine compounds in a dielectric insulation gas has been suggested.

Specifically, WO-A-2010/142346 discloses a dielectric insulation medium comprising a fluoroketone containing from 4 to 12 carbon atoms. Further, WO-A-2012/080246 discloses a fluoroketone containing exactly 5 carbon atoms (hereinafter referred to as "C5K") in a mixture with a dielectric insulation gas component different from said C5K to be particularly preferred.

Fluoroketones have been shown to have high insulation capabilities, in particular a high dielectric strength, as well as high arc extinction capabilities. At the same time, they have a very low Global Warming Potential (GWP) and very low toxicity. The combination of these characteristics renders these fluoroketones highly suitable as a possible alternative to conventional insulation gases.

Notwithstanding the above-mentioned excellent properties of a fluoroketone-containing insulation gas, it has unexpectedly been found that care must be taken to avoid a reduction in their insulation and arc extinction performance over prolonged operation times. Otherwise, a situation could ultimately occur that maintenance intervals were shortened or that operation of the apparatus should prematurely be interrupted in order to replace at least a portion of the insulation gas.

In addition, it has unexpectedly been found that also care should be taken to avoid that the functionality of components of the apparatus, which are directly exposed to the fluoroketone-containing insulation gas, could adversely be affected during exposure over prolonged operation times. This could ultimately likewise lead to the situation mentioned above, that maintenance intervals were shortened or that operation of the apparatus should prematurely be interrupted, in this case for replacement of the respective component. For example, sealing components made of a polymeric material available on the market have surprisingly been found to be sensitive to C5K exposure at operational conditions.

The above findings regarding the potential reduction in performance of the insulation gas and in functionality of certain components are contrary to the general assumption that fluoroketones are non-reactive at operational conditions of the apparatus. This general assumption is reflected by the fact that there is nothing in the state of art reporting on potential instability and incompatibility issues that might arise when using fluoroketones in general and C5K in specific.

In consideration of the above, the problem to be solved by the present invention is, thus, to provide an apparatus for the generation, the distribution and/or the usage of electrical energy, said apparatus comprising a dielectric insulation medium containing an organofluorine compound in general, and a fluoroketone in specific, said apparatus allowing at the same time for a safe and efficient operation over a relatively long period of time.

The problem is solved by the subject matter of the independent claims. Preferred embodiments of the invention are defined in the dependent claims and in claim combinations.

The apparatus of the present invention comprises a housing enclosing an insulating space and an electrically conductive part arranged in the insulating space, said insulating space containing a dielectric insulation medium at least a portion of which being in the form of an insulation gas comprising an organofluorine compound, in particular a fluoroketone. Additionally, the insulation medium, and specifically the insulation gas, can comprise one or more degradation products (or "decomposition products") of the organofluorine compound, as will be discussed below.

According to the invention, at least some of the components of the apparatus that are directly exposed to the insulation gas are made of a material which remains unaltered during exposure to the insulation gas for a predetermined period of time, which is here more than 1 year, at operational conditions. In other words, a prolonged contact of more than 1 year with the insulation gas comprising the organofluorine compound and, as the case may be, the decomposition product(s) does not alter the material's properties that are essential for fulfilling its function.

According to this first aspect of the present invention, the functionality of the components is maintained and there is, thus, no need for regular replacement of the components, ultimately allowing for a long service lifetime and a low maintenance of the apparatus.

Specifically, the term "component" as used in the context of the present invention relates to any component of essentially stable form, more specifically to any solid or semi-solid component. Particularly, coating compounds, more particularly paints or resins, as well as sealing compounds are encompassed by the term "component". Paste-like components, such as a lubricating compound or grease, are also encompassed.

The term "for a predetermined period of time" relates to a period of more than 1 year, more preferably of more than 2 years, even more preferably of more than 5 years, and most preferably of more than 10 years. Thus it is preferred, that the components of the apparatus that are directly exposed to the insulation gas are made of a material which remains unaltered during exposure to the insulation gas for a period of more than 2 years, more preferably of more than 5 years, and most preferably of more than 10 years.

In particular, the term "insulation medium" as used in the context of the present invention relates to an insulation fluid. Since at least a portion of the insulation medium is in the form of an insulation gas, the insulation medium can be entirely in gaseous form or can be a two-phase system comprising a portion in gaseous form and a portion in liquid form.

In particular, the insulation medium, and in particular the insulation gas, can comprise one or more degradation products of the organofluorine compound. This can in particular be the case when the apparatus is a switching apparatus, more particularly a switchgear or a component thereof. When using an insulation gas comprising 1,1,1,3,4,4,4-heptafluoro-3-(trifluoromethyl)butan-2-one, the degradation product can particularly be hexafluoropropene and/or heptafluoropropene.

In particular, in the context of the present invention the term "directly exposed to the insulation gas" is to be understood as being in direct contact with the insulation gas.

Alternatively or additionally to the first aspect mentioned above, a least some of the components of the apparatus that are directly exposed to the insulation gas have a surface, at least a portion of which is devoid of any nucleophilic group reactive towards the organofluorine compound and/or reactive towards any degradation product of the organofluorine compound at operational conditions. The term "devoid of any nucleophilic group" relates both to compounds which are an integral part of the material as well as compounds which are bound in any way to the surface of the material, e.g. resulting from condensation of a gas component of the insulation medium.

The term "nucleophilic group" relates to any chemical group that is able to donate (in a chemical reaction) an electron pair to an electrophile to form a chemical bond. In particular, the term "nucleophilic group" thus specifically relates to any chemical group which is considered nucleophilic in relation to the organofluorine compound or its degradation product(s) which are considered the electrophile.

According to this second aspect, decomposition reactions with the organofluorine compound, such as a nucleophilic substitution of the fluoroketone's carbonyl group, are efficiently prevented and the integrity of the insulation gas and thus also its insulation and arc extinction performance is maintained, which further contributes to a long service lifetime and a low maintenance of the apparatus.

In addition, safety or health risks that may be caused by decomposition products are according to this aspect of the present invention reduced or even eliminated. This is of particular relevance in the case where one potential decomposition product is hydrogen fluoride (HF), which is highly corrosive and extremely toxic.

The relevance of decomposition products being reduced or eliminated is further emphasized by the fact that some decomposition products might open reaction pathways which are closed for the organofluorine compound on which they are based. This is for example the case for copper which has the potential to react with a decomposition product of C5K, but not with C5K itself. Such secondary reactions are efficiently reduced or even eliminated by the present invention.

According to embodiments of the second aspect, any compound contained on the surface of the component forming an integral part of the material and/or any compound bound to the surface is or are devoid of any nucleophilic group.

According to embodiments of the first and any other aspect, at least some of the components are made of or comprise a material selected from the group consisting of: a polymeric material, a metal, a metal alloy, a ceramic, a composite thereof, mixtures thereof, combinations thereof; in particular a polymeric material (including a polymeric material contained in a composite material). It is in this regard particularly preferred that the polymeric material is selected from the group consisting of silicones, polyolefins, polyethers, polyesters, polyurethanes, polyepoxides, polyamides, polyimides, polyketones and polysulfones, as well as mixtures thereof.

The term "at least some of the components" as used in the context of the present invention can relate to only one of the components, two or more of the components and/or all components that are directly exposed to, i.e. are in direct contact with, the insulation medium.

In embodiments in which at least some of the components are made of or comprise a polymeric material, it is preferred that the polymeric material comprises at least one plasticizer, the amount and/or the type of the at least one plasticizer being such that it does not exude out of the material when exposed to an organofluorine-containing insulation gas at operational conditions.

According to preferred embodiments of the present invention, the amount of plasticizer in the polymeric material is less than 10 wt.-%, preferably less than 8 wt.-%, more preferably less than 6 wt.-%, and most preferably less than 4 wt.-%, based on the total weight of the polymeric material, since no exudation (or "sweating out") of the plasticizer is observed when present in these amounts. According to these embodiments, the material properties are thus neither changed due to a change in the content of plasticizer nor does the plasticizer give rise to any soiling of surfaces of the components and/or of the insulation space.

Keeping the amount of plasticizer below the levels disclosed above is in clear distinction to the amounts of plasticizers used in commercially available sealing components which have an amount of plasticizer of more than 15 wt.-%.

Alternatively or additionally, further preferred embodiments are that the plasticizer contained in the polymeric material has a molecular weight higher than 450 g/mol. The reason is that it has been found that a plasticizer of this molecular weight does not exude (or "sweat") out of the material when exposed to an organofluorine-containing insulation gas, whereas exudation might occur, if the plasticizer had a lower molecular weight.

Using a plasticizer having a molecular weight above the threshold molecular weight of 450 g/mol disclosed herein is in clear distinction to the amounts of plasticizers used in commercially available sealing components comprising a plasticizer having a low molecular weight, i.e. lower than 450 g/mol.-%.

The term "plasticizer" as used in the context of the present invention relates to any additive of the polymeric material which is added for improving the flexibility and durability of the polymeric material. The plasticizers work by embedding themselves between the chains of the polymers, spacing them apart (and thus increasing the "free volume"), which results in a significant lowering of the glass transition temperature of the material (compared to the polymeric matrix without the plasticizer) and makes it softer.

The term "plasticizer" in particular includes ester plasticizers, such as sebacates, adipates, terephthalates, benzoates, dibenzoates, gluterates, phthalates, azelates, maleates, glycols, organophosphates, polymeric plasticizers, polyethers and oils. Given their specific purpose, the term also encompasses softeners, extenders, and lubricants.

According to further preferred embodiments, the total amount of volatile organic compounds in the polymeric material is less than 1 wt.-% based on the total weight of the polymeric material. In this context, the term "volatile organic compounds" encompasses besides the volatile organic compounds (VOC) sense stricto also the very volatile organic compounds (VVOC) and the semi volatile organic compounds (SVOC). Specifically, the boiling point of the volatile organic compound is thus selected to be less than 400° C., more specifically less than 260° C.

No "outgassing" of the volatile organic compound from the material of the component is observed when present in an amount below the level mentioned above. As a result, not only the functionality of the component remains unaffected, but also a potential reaction of the volatile organic compound is prevented, independent of whether the volatile organic compound is in liquid phase, e.g. at the solid-gas interface, or is in gaseous phase.

The amount of volatile organic compounds in the polymeric material being less than 1 wt.-% based on the total weight of the polymeric material is of particular relevance, if the VOC is in the form of a low molecular weight alcohol, since this would—if present in a higher amount—potentially give rise to a nucleophilic substitution with e.g. the carbonyl group of the fluoroketone.

Typically, the polymeric material further contains a filler, e.g. for providing the required mechanical properties to the material.

In embodiments the polymeric material contains at least one functionalized and/or unfunctionalized metal oxide, and/or the polymeric material contains at least one functionalized and/or unfunctionalized metal hydroxide.

In further embodiments, at least a portion, in particular all, of the metal oxide and/or metal hydroxide contained in the polymeric material is unfunctionalized, the amount of unfunctionalized metal oxide and/or metal hydroxide being equal to or less than 5 wt.-%, preferably is 4 wt.-% or less, more preferably is 2 wt.-% or less, and even more preferably is less than 1 wt.-%, and most preferably is approximately 0 wt.-%.

In further embodiments the amount of metal oxide and/or metal hydroxide, in particular the total amount of metal oxide and/or metal hydroxide, contained in the polymeric material is 5 wt.-% at most, preferably 4 wt.-% at most, more preferably 2 wt.-% at most, even more preferably is less than 1 wt.-%, and most preferably is at least approximately or is exactly 0 wt.-%. According to a specific embodiment, the polymeric material is devoid of any metal oxide and/or metal hydroxide.

The terms "metal oxide" and "metal hydroxide" are in the context of the present invention, and in particular of the above embodiment, to be understood as metal compounds having a free oxide group or a free hydroxide group, respectively. They are, however, not to be interpreted as encompassing compounds, the oxide or hydroxide group of which is functionalized or blocked, unless explicitly stated to be so. The above embodiment relating to "the amount of metal oxide and/or metal hydroxide" thus particularly relates to the amount of metal compounds having a free oxide group or a free hydroxide group, respectively, i.e. to unfunctionalized metal oxide and/or unfunctionalized hydroxide.

If for the component according to the present invention a polymeric material is to be used which requires an amount of filler higher than the upper limits given for the above mentioned embodiments, it is preferred that at least the portion of the filler exceeding the respective upper limit is substituted by a filler being devoid of an oxide or a hydroxide group and/or is functionalized in a manner such that they are devoid of a free oxide or hydroxide group, respectively. As a filler being devoid of an oxide or a hydroxide group, carbon black can for example be used.

According to a specific embodiment, the polymeric material contains a filler based on a metal oxide and/or metal hydroxide, wherein at least a portion, in particular all, of the metal oxide and/or metal hydroxide is functionalized.

In particular, the term "functionalization" or "functionalized" relates to a treatment by which a property of a first chemical entity is altered. Specifically, the term "functionalization" or "functionalized" relates to the reaction of a first chemical entity with another chemical entity whereby the reactivity of the first chemical entity is altered. The first chemical entity can e.g. be a reactive group, such as a nucleophilic group. Specifically, it can be the oxide group of a metal oxide or the hydroxide group of a metal hydroxide, respectively. Particularly, the term "functionalization" or "functionalized" relates to the blocking of a first reactive group, whereby the first reactive group is rendered chemically inert, i.e. unreactive towards any other component present in the respective system.

Functionalization can for example be achieved by halogenation, in particular fluorination, or by alkylation with an alkyl group or a fluoroalkyl group.

According to a particularly preferred embodiment, at least a portion of the surface of the component is hydrophobic. More particularly, at least a portion of the surface of the component has a contact angle of more than 90° when contacted with water. Due to its hydrophobicity, the component's surface is essentially free of water; reactions, which might otherwise occur on the solid-gas interface when water is bound to it, are thus efficiently reduced or even prevented.

In embodiments, if the surface of a component (be it made of a polymeric material as described above or of a metal or a metal alloy or a ceramic) has exposed nucleophilic groups, at least some of the nucleophilic groups shall be functionalized. Again, functionalization can for example be achieved by halogenation, in particular fluorination, or by alkylation with an alkyl group or a fluoroalkyl group. In this regard, the surface treatment can be a chemical treatment, a plasma treatment and/or a chemical vapour deposition, in particular a plasma-enhanced chemical vapour deposition.

Preferably, the organofluorine compound comprised in the dielectric insulation gas is selected from the group consisting of fluoroethers, in particular hydrofluoromonoethers, fluoroketones, in particular perfluoroketones, fluoroolefins, in particular hydrofluoroolefins, and fluoronitriles, in particular perfluoronitriles, and mixtures thereof.

It is thereby particularly preferred that the insulation medium comprises a fluoroketone containing from four to twelve carbon atoms, preferably containing exactly five carbon atoms or exactly six carbon atoms or mixtures thereof. The advantages achieved by the present invention are particularly pronounced when the insulation medium comprises a fluoroketone as defined above, since any problem, which might otherwise arise from the ketone group being subject to nucleophilic substitution, can be avoided.

The term "fluoroketone" as used in this application shall be interpreted broadly and shall encompass both perfluoroketones and hydrofluoroketones, and shall further encompass both saturated compounds and unsaturated compounds, i.e. compounds including double and/or triple bonds between carbon atoms. The at least partially fluorinated alkyl chain of the fluoroketones can be linear or branched, or can form a ring, which optionally is substituted by one or more alkyl groups. In exemplary embodiments, the fluoroketone is a perfluoroketone. In further exemplary embodiment, the fluoroketone has a branched alkyl chain, in particular an at least partially fluorinated alkyl chain. In still further exemplary embodiments, the fluoroketone is a fully saturated compound.

As mentioned, it is particularly preferred that the insulation medium comprises a fluoroketone containing exactly five carbon atoms or exactly six carbon atoms or mixtures thereof. Compared to fluoroketones having a greater chain length with more than six carbon atoms, fluoroketones containing five or six carbon atoms have the advantage of a relatively low boiling point. Thus, problems which might go along with liquefaction can be avoided, even when the apparatus is used at low temperatures.

According to embodiments, the fluoroketone is at least one compound selected from the group consisting of the compounds defined by the following structural formulae in which at least one hydrogen atom is substituted with a fluorine atom:

Fluoroketones containing five or more carbon atoms are further advantageous, because they are generally non-toxic with outstanding margins for human safety. This is in contrast to fluoroketones having less than four carbon atoms, such as hexafluoroacetone (or hexafluoropropanone), which are toxic and very reactive. In particular, fluoroketones containing exactly five carbon atoms, herein briefly named C5K, and fluoroketones containing exactly six carbon atoms are thermally stable up to 500° C.

In embodiments of this invention, the fluoroketones, in particular C5K), having a branched alkyl chain are preferred, because their boiling points are lower than the boiling points of the corresponding compounds (i.e. compounds with same molecular formula) having a straight alkyl chain.

According to embodiments, the C5K is a perfluoroketone, in particular has the molecular formula $C_5F_{10}O$, i.e. is fully saturated without double or triple bonds between carbon atoms. The fluoroketone a) may more preferably be selected from the group consisting of 1,1,1,3,4,4,4-heptafluoro-3-(trifluoromethyl)butan-2-one (also named decafluoro-2-methylbutan-3-one), 1,1,1,3,3,4,4,5,5,5-decafluoropentan-2-one, 1,1,1,2,2,4,4,5,5,5-decafluoropentan-3-one and octafluorocylcopentanone, and most preferably is 1,1,1,3,4,4,4-heptafluoro-3-(trifluoromethyl)butan-2-one.

1,1,1,3,4,4,4-heptafluoro-3-(trifluoromethyl)butan-2-one can be represented by the following structural formula (I):

1,1,1,3,4,4,4-heptafluoro-3-(trifluoromethyl)butan-2-one with molecular formula $CF_3C(O)CF(CF_3)_2$ or $C_5F_{10}O$, has been found to be particularly preferred for high and medium voltage insulation applications, because it has the advantages of high dielectric insulation performance, in particular in mixtures with a dielectric carrier gas, has very low GWP and has a low boiling point. It has an ODP of 0 and is practically non-toxic.

According to embodiments, even higher insulation capabilities can be achieved by combining the mixture of different fluoroketone components. In embodiments, a fluo- roketone containing exactly five carbon atoms, as described above and here briefly called C5K, and a fluoroketone containing exactly six carbon atoms or exactly seven carbon atoms, here briefly named fluoroketone c), can favourably be part of the dielectric insulation at the same time. Thus, an insulation medium can be achieved having more than one fluoroketone, each contributing by itself to the dielectric strength of the insulation medium.

In embodiments, the further fluoroketone c) is at least one compound selected from the group consisting of the compounds defined by the following structural formulae in which at least one hydrogen atom is substituted with a fluorine atom:

(IIa)

(IIb)

(IIc)

(IId)

(IIe)

(IIf)

and

(IIg)

as well as any fluoroketone having exactly 6 carbon atoms, in which the at least partially fluorinated alkyl chain of the fluoroketone forms a ring, which is substituted by one or more alkyl groups (IIh);
and/or is at least one compound selected from the group consisting of the compounds defined by the following structural formulae in which at least one hydrogen atom is substituted with a fluorine atom:

(IIIa)

(IIIb)

(IIIc)

(IIId)

(IIIe)

(IIIf)

(IIIg)

(IIIh)

(IIIi)

(IIIj)

(IIIk)

(IIIl)

(IIIm)

and (IIIn)

in particular dodecafluoro-cycloheptanone, as well as any fluoroketone having exactly 7 carbon atoms, in which the at least partially fluorinated alkyl chain of the fluoroketone forms a ring, which is substituted by one or more alkyl groups (IIIo).

The present invention encompasses each compound or each combination of compounds selected from the group consisting of the compounds according to structural formulae (Ia) to (Ii), (IIa) to (IIh), (IIIa) to (IIIo), and mixtures thereof.

Depending on the specific application of the apparatus of the present invention, a fluoroketone containing exactly six carbon atoms (falling under the designation "fluoroketone c)" mentioned above) may be preferred; such a fluoroketone is non-toxic, with outstanding margins for human safety.

In embodiments, fluoroketone c), alike C5K, is a perfluoroketone, and/or has a branched alkyl chain, in particular an at least partially fluorinated alkyl chain, and/or the fluoroketone c) contains fully saturated compounds. In particular, the fluoroketone c) has the molecular formula $C_6F_{12}O$, i.e. is fully saturated without double or triple bonds between carbon atoms. More preferably, the fluoroketone c) can be selected from the group consisting of 1,1,1,2,4,4,5,5,5-nonafluoro-2-(trifluoromethyl)pentan-3-one (also named dodecafluoro-2-methylpentan-3-one), 1,1,1,3,3,4,5,5,5-nonafluoro-4-(trifluoromethyl)pentan-2-one (also named dodecafluoro-4-methylpentan-2-one), 1,1,1,3,4,4,5,5,5-nonafluoro-3-(trifluoromethyl)pentan-2-one (also named dodecafluoro-3-methylpentan-2-one), 1,1,1,4,4,4-hexafluoro-3,3-bis-(trifluoromethyl)butan-2-one (also named dodecafluoro-3,3-(dimethyl)butan-2-one), dodecafluorohexan-2-one, dodecafluorohexan-3-one and decafluorocyclohexanone, and particularly is the mentioned 1,1,1,2,4,4,5,5,5-nonafluoro-2-(trifluoromethyl)pentan-3-one.

1,1,1,2,4,4,5,5,5-Nonafluoro-2-(trifluoromethyl)pentan-3-one (also named dodecafluoro-2-methylpentan-3-one) can be represented by the following structural formula (II):

(II)

1,1,1,2,4,4,5,5,5-Nonafluoro-4-(trifluoromethyl)pentan-3-one (here briefly called "C6-ketone", with molecular formula $C_2F_5C(O)CF(CF_3)_2$) has been found to be particularly preferred for high voltage insulation applications because of its high insulating properties and its extremely low GWP. Specifically, its pressure-reduced breakdown field strength is around 240 kV/(cm*bar), which is much higher than the one of air having a much lower dielectric strength (E, =25 kV/(cm*bar). It has an ozone depletion potential of 0 and is non-toxic (LC50 of about 100'000 ppm). Thus, the environmental impact is very low, and at the same time outstanding margins for human safety are achieved.

Additionally or alternatively, the insulation medium preferably comprises a hydrofluoromonoether containing at least three carbon atoms.

As mentioned above, the organofluorine compound can also be a fluoroolefin, in particular a hydrofluoroolefin. More particularly, the fluoroolefin or hydrofluoroolefin, respectively, contains exactly three carbon atoms.

According to particularly preferred embodiments, the hydrofluoroolefin is thus selected from the group consisting of: 1,1,1,2-tetrafluoropropene (HFO-1234yf), 1,2,3,3-tetrafluoro-2-propene (HFO-1234yc), 1,1,3,3-tetrafluoro-2-propene (HFO-1234zo), 1,1,1,3-tetrafluoro-2-propene (HFO-1234ze), 1,1,2,3-tetrafluoro-2-propene (HFO-1234ye), 1,1,1,2,3-pentafluoropropene (HFO-1225ye), 1,1,2,3,3-pentafluoropropene (HFO-1225yc), 1,1,1,3,3-pentafluoropropene (HFO-1225zo), (Z)1,1,1,3-tetrafluoropropene (HFO-1234zeZ), (Z)1,1,2,3-tetrafluoro-2-propene (HFO-1234yeZ), (E)1,1,1,3-tetrafluoropropene (HFO-1234zeE), (E)1,1,2,3-tetrafluoro-2-propene (HFO-1234yeE), (Z)1,1,1,2,3-pentafluoropropene (HFO-1225yeZ), (E)1,1,1,2,3-pentafluoropropene (HFO-1225yeE), and combinations thereof.

As mentioned above, the organofluorine compound can also be a fluoronitrile, in particular a perfluoronitrile. In particular, the organofluorine compound can be a fluoronitrile, specifically a perfluoronitrile, containing two carbon atoms, three carbon atoms or four carbon atoms.

More particularly, the fluoronitrile can be a perfluoroalkylnitrile, specifically perfluoroacetonitrile, perfluoro-propionitrile ($C_2F_5CN$) and/or perfluorobutyronitrile ($C_3F_7CN$).

Most particularly, the fluoronitrile can be perfluoroisobutyronitrile [according to the formula $(CF_3)_2CFCN$] and/or perfluoro-2-methoxypropanenitrile [according to the formula $CF_3CF(OCF_3)CN$]. Of these species, perfluoroisobutyronitrile is particularly preferred due to its low toxicity.

According to a further preferred embodiment, the insulation medium comprises carbon dioxide ($CO_2$).

Additionally or alternatively, the insulation medium comprises air or at least one air component, in particular selected from the group consisting of oxygen ($O_2$), nitrogen ($N_2$), carbon dioxide ($CO_2$), and mixtures thereof.

According to a particularly preferred embodiment, the insulation medium comprises carbon dioxide and oxygen. It is thereby particularly preferred that the ratio of the amount of carbon dioxide to the amount of oxygen ranges from 50:50 to 100:1.

In particular in view of interrupting the current in a high voltage switchgear, it is a further preferred that the ratio of the amount of carbon dioxide to the amount of oxygen ranges from 80:20 to 95:5, more preferably from 85:15 to 92:8, even more preferably from 87:13 to less than 90:10, and in particular is about 89:11. In this regard, it has been found on the one hand that oxygen being present in a molar fraction of at least 5% allows soot formation to be prevented even after repeated current interruption events with high current arcing. On the other hand, oxygen being present in a molar fraction of at most 20% (i.e. of 20% or less), more particularly of at most 15% (i.e. of 15% or less), reduces the risk of degradation of the material of the electrical apparatus by oxidation.

In embodiments, the apparatus of the invention, in particular gas-insulated apparatus, is part of or is a: (gas-insulated) high voltage apparatus, (gas-insulated) medium voltage apparatus, (gas-insulated) low voltage apparatus, direct-current apparatus, switchgear, air-insulated switchgear, part or component of air-insulated switchgear, gas-insulated metal-encapsulated switchgear (GIS), part or component of gas-insulated metal-encapsulated switchgear, gas-insulated transmission line (GIL), busbar, bushing, gas-insulated cable, cable joint, current transformer, voltage transformer, sensors, humidity sensors, surge arrester, capacitor, inductance, resistor, current limiter, high voltage switch, earthing switch, disconnector, combined disconnector and earthing switch, load-break switch, circuit breaker, gas circuit breaker, gas-insulated vacuum circuit breaker, generator circuit breaker, medium voltage switch, ring main unit, recloser, sectionalizer, low voltage switch, any type of gas-insulated switch, transformer, distribution transformer, power transformer, tap changer, transformer bushing, electrical rotating machine, generator, motor, drive, semiconducting device, power semiconductor device, power converter, converter station, convertor building; and components and/or combinations of such devices.

According to a further aspect, the present invention also relates to a component designed to be mounted (i.e. specifically built to be incorporated and to be used) in an apparatus as defined above, in which the component is to be directly exposed to the insulation medium.

In embodiments, the component is made of a material which during exposure to an insulation gas comprising an organofluorine compound for a period of more than 1 year at operational conditions remains unaltered and/or which has a surface, at least a portion of which is devoid of any nucleophilic group reactive towards the organofluorine compound and/or reactive towards any degradation product of the organofluorine compound, in particular at operational conditions of the apparatus in which it is to be mounted.

It is understood that the preferred features disclosed in the context of the apparatus likewise apply to embodiments of the component itself, which in particular shall also apply vice versa.

According to specific embodiments, the component is selected from the group consisting of: a coating compound, in particular a paint or a resin, a sealing compound, an adhesive, an insulating compound, a lubricating compound, in particular grease, a molecular sieve, a binder-free molecular sieve, a desiccant, a binder-free desiccant, a humidity sensing material, as well as combinations thereof.

In embodiments of a binder-free molecular sieve and/or binder-free desiccant, the molecular sieve and/or desiccant is in powder form and can be present in the apparatus e.g. in containers or on a carrier, as disclosed in the co-pending still unpublished PCT application No. PCT/EP2013/070834 filed today, in particular therein p. 9, 1.27-p. 10, 1.23 and also in the description of FIGS. 2, 3a, 3b on p. 35, 1.26-p. 36, 1.34 and in the additional delimiting features in claims 25-27, the disclosure of which is herewith incorporated literally and in its entirety into this application by reference.

Humidity measurement (using a humidity sensing material) is of particular relevance in an apparatus according to the present invention, since water can deteriorate the insulation capability not only of the gaseous insulation medium, but also of any other insulator, such as solid spacers, insulators etc. Also, the condensation of water onto surfaces increases the risk of flashovers. In particular in view of the use of an organofluorine compound, more particularly a fluoroketone, this organofluorine compound or fluoroketone can react with water to a corrosive and toxic decomposition product. This further emphasizes the importance of monitoring the humidity in the apparatus and keeping it at a low level.

For the reasons given above, suitable humidity measurement techniques shall not rely on the detection of dew formation. Instead, suitable humidity measurement techniques and devices include the following:

a) Capacitive Humidity Measurement

This technique uses a humidity sensing material, the dielectric constant of which changes in relation to the water (humidity) content present. The preferred features specified for the component in the context of the apparatus likewise relates to this capacitive humidity sensing material. Thus, if a polymeric material is used as a (capacitive) humidity sensing material, it preferably contains less than 10 wt.-% plasticizer and/or contains a plasticizer having a molecular weight higher than 450 g/mol. Alternatively to using a polymeric capacitive humidity sensing material, a metal oxide, such as e.g. $Al_2O_3$, can be used as a humidity sensing material.

b) Resistive Humidity Measurement

This technique uses a humidity sensing material, the resistance or conductance of which changes in relation to the water (humidity) content present in the apparatus or at a surface of the component in the apparatus. The preferred features specified for the component in the context of the apparatus likewise relate to embodiments of this resistive humidity sensing material. Thus, if a polymeric material is used as a (resistive) humidity sensing material, it preferably contains less than 10 wt.-% plasticizer and/or contains a plasticizer having a molecular weight higher than 450 g/mol.

c) Quartz Crystal Analyser

According to this technique or device, the humidity sensing material is an oscillating quartz resonator coated with a hygroscopic layer. In the presence of humidity, the mass loading on the oscillator changes in relation to the water content present, leading to a change in resonance frequency. An example for such a device is the QMA-2030, Process Moisture Analyzer from Michell Instrument, United Kingdom. Also for this embodiment, the preferred features specified for the component in the context of the apparatus likewise relate to embodiments of such a humidity sensing material, i.e. the hygroscopic layer coated on the resonator.

d) Thermal Conductivity

According to this technique, absolute humidity is quantified via the thermal conductivity of a reference gas compared to the same gas containing moisture.

Also other types of sensors e.g. for humidity measurement etc. can be present in the apparatus, including e.g. optical sensors, that may be components of the apparatus in the sense of this application and shall be material-designed according to the subject-matter and embodiments of the appended claims.

Furthermore, for all such measurement techniques as exemplarily mentioned above, at least some of the parts of the measurement devices can alternatively or in addition be protected by a respective enclosure, in order to reduce or even avoid interference or damages caused by the presence of decomposition products, such as hydrogen fluoride (HF). In particular, semipermeable membranes can be used that restrict the passage to the nominal insulation gas components and water.

As mentioned above, the present invention encompasses embodiments in which a polymeric material containing a filler is used and that, in order not to exceed the preferred upper limit of a metal oxide or metal hydroxide contained in the polymeric material, it is possible to functionalize the respective functional group.

According to a still further aspect, the present invention also relates to a process for producing or preparing a component for an apparatus as described above, the component being made of a polymeric material containing a filler based on a metal oxide and/or metal hydroxide, wherein prior to the compounding of the material the metal oxide or metal hydroxide, respectively, is functionalized.

According to a further aspect, the present invention further relates to a process for producing or preparing a component for an apparatus as defined above, the component being made of a metal, a metal alloy, a ceramic and/or a composite thereof, wherein at least a part of the exposed nucleophilic groups of the component's surface is functionalized.

With regard to the above processes, functionalization can for example be achieved by halogenation, in particular fluorination, or by alkylation with an alkyl group or a fluoroalkyl group, as mentioned above.

For the surface treatment, i.e. the functionalization of the exposed nucleophilic groups of a surface of the component, a chemical treatment, a plasma treatment and/or a chemical vapour deposition, in particular plasma-enhanced chemical vapour deposition, can be used.

In particular, the preferred features disclosed in the context of the apparatus or the component of the present invention likewise apply to embodiments of the process and vice versa.

The present invention is further illustrated by way of the attached examples and figures.

EXAMPLES

Example 1

Figure 1A:
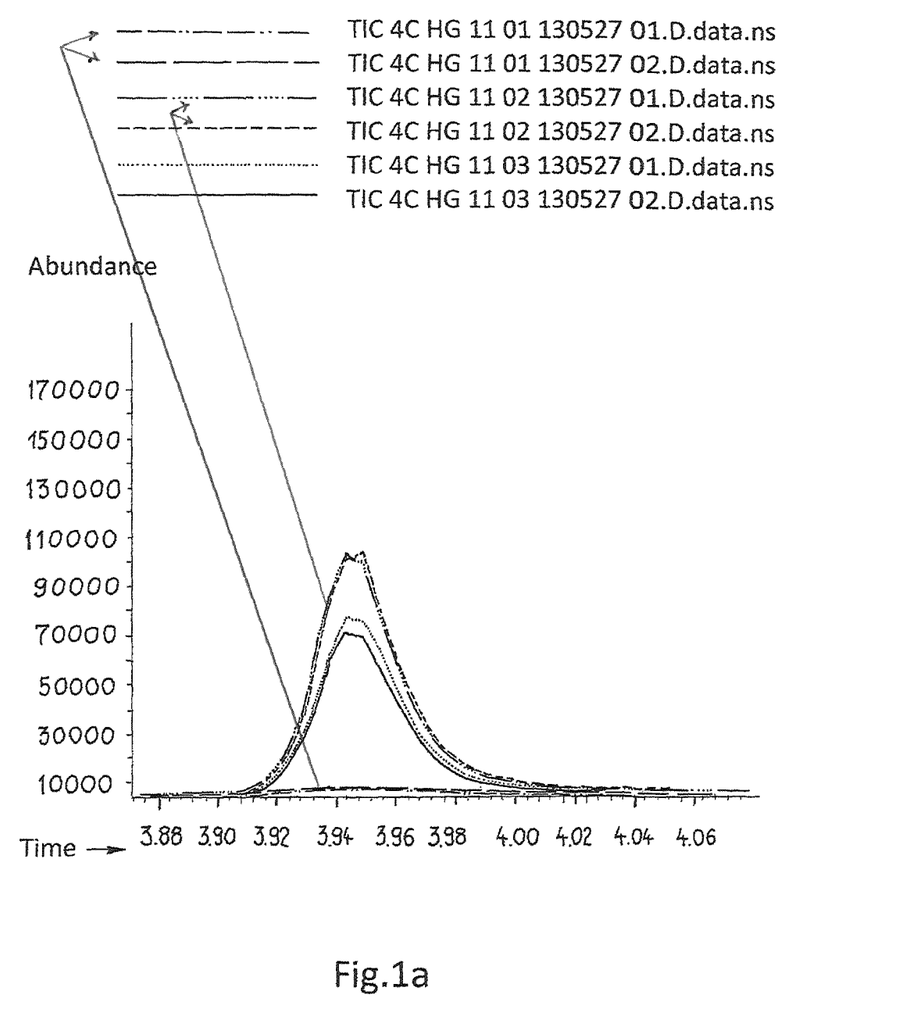
FIG. 1a is a graph illustrating a gas chromatogram (abundance in a.u. versus retention time in minutes) in which the peak of a first decomposition product (hexafluoropropene) is plotted for the three samples 4C_HG_11_01, 4C_HG_11_02, 4C_HG_11_03 with two measurements for each.
Figure 1B:
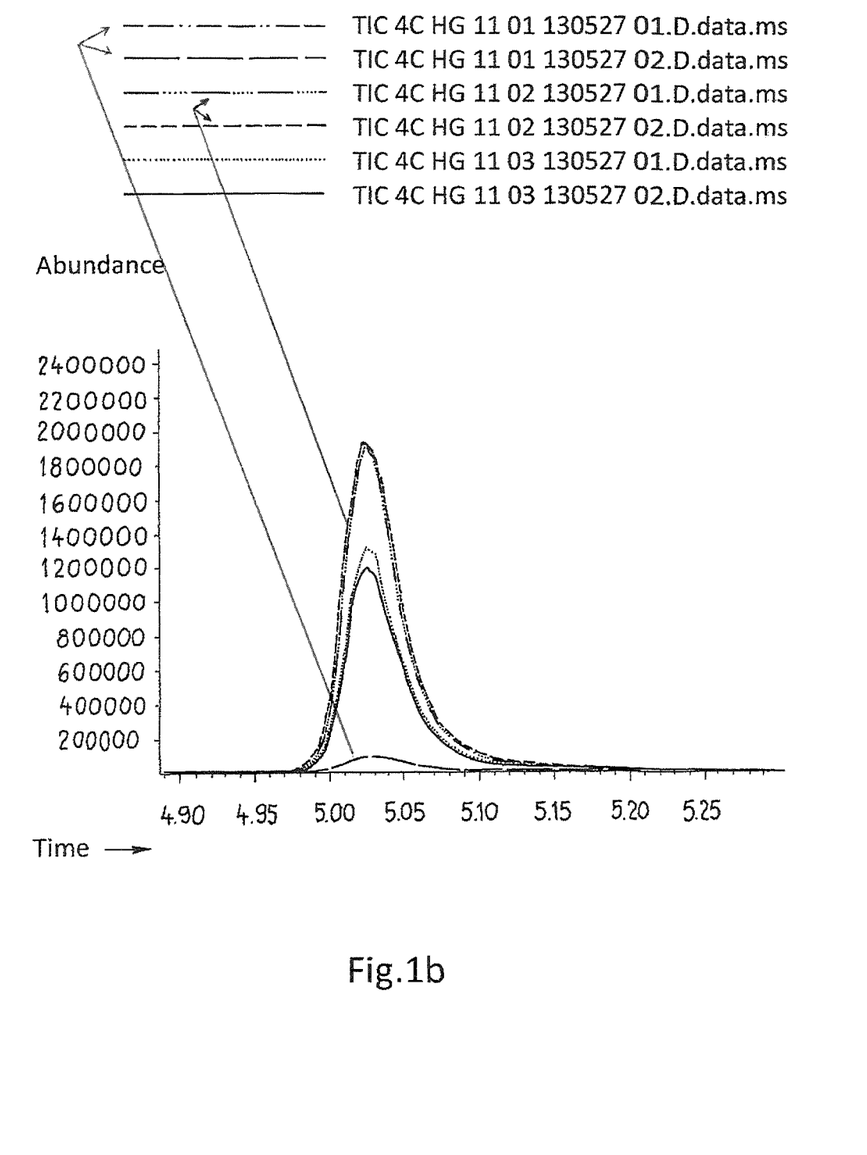
FIG. 1b is a graph illustrating a gas chromatogram (abundance in a.u. versus retention time in minutes) in which the peak of a second decomposition product (heptafluoropropene) is plotted for the three samples 4C_HG_11_01, 4C_HG_11_02, 4C_HG_11_03 with two measurements for each.

Three different paints were provided, one being a powder coating and thus comprising no VOC (sample 4C_HG_11_01 according to the present invention, see FIG. 1a, 1b) and the other two being solvent-based coatings comprising more than 1 wt.-% of VOC (comparative samples 4C_HG_11_02 and 4C_HG_11_03, see FIG. 1a, 1b). For each sample, a coated substrate was exposed to an insulation gas comprising 1,1,1,3,4,4,4-heptafluoro-3-(trifluoromethyl)butan-2-one at 1 bar in an autoclave at a temperature of 100° C. for one month.

The amount of two decomposition products obtained by the exposure is shown in

FIG. 1a relating to a gas chromatogram (abundance in a.u. versus retention time in minutes) in which the peak of a first decomposition product (hexafluoropropene) is plotted for the three samples 4C_HG_11_01, 4C_HG_11_02, 4C_HG_11_03 with two measurements for each; and FIG. 1b relating to a gas chromatogram (abundance in a.u. versus retention time in minutes) in which the peak of a second decomposition product (heptafluoropropene) is plotted for the three samples 4C_HG_11_01, 4C_HG_11_02, 4C_HG_11_03 with two measurements for each.

As is clear from the chromatograms showing two measurements (130527_01 and 130527_02, for confirmation purposes) for each of the three samples, only neglectable amounts of both the first and the second decomposition products have been detected after exposing the sample according to the present invention to the insulation gas, whereas for the comparative samples the respective peaks in the chromatograms are pronounced. In this regard, it is to be noted that in FIG. 1b the result of the second measurement of sample 4C_HG_11_01 is shown superimposed with the result of the first measurement.

Example 2

A rubber containing a plasticizer having a molecular weight higher than 450 g/mol, said plasticizer being present in an amount of less than 10 wt.-% based on the total weight of the polymeric material was provided (herein called sample 2_01). As comparative samples, a rubber having a plasticizer content of more than 15 wt.-% (herein called sample 2_02) and a rubber containing bis(2-ethylhexyl) sebacate, i.e. a plasticizer having a molecular weight of 427 g/mol and, thus, lower than 450 g/mol (herein called sample 2_03), were provided.

All samples were exposed to an insulation gas comprising 1,1,1,3,4,4,4-heptafluoro-3-(trifluoromethyl)butan-2-one at 1 bar in an autoclave at a temperature of 100° C. for one month.

After exposure, no exudation (i.e. sweating out) was observed for sample 2_01, i.e. the sample according to the present invention, whereas for the comparative samples 2_02 and 2_03, exuded material in the form of a greasy material was clearly visible. For sample 2_03, NMR analysis of the greasy material revealed the structure of bis(2-ethylhexyl)sebacate. These results on the samples 2_01, 2_02 and 2_03 were verified experimentally (not shown in a figure).

Example 3

A rubber containing a filler based on silanized silica (first sample according to the invention) and, as a comparative sample, a corresponding rubber containing a $SiO_2$ filler were provided. All samples were exposed to an insulation gas comprising 1,1,1,3,4,4,4-heptafluoro-3-(trifluoromethyl)butan-2-one at 1 bar in an autoclave at a temperature of 100° C. for one month.

Figure 2A:
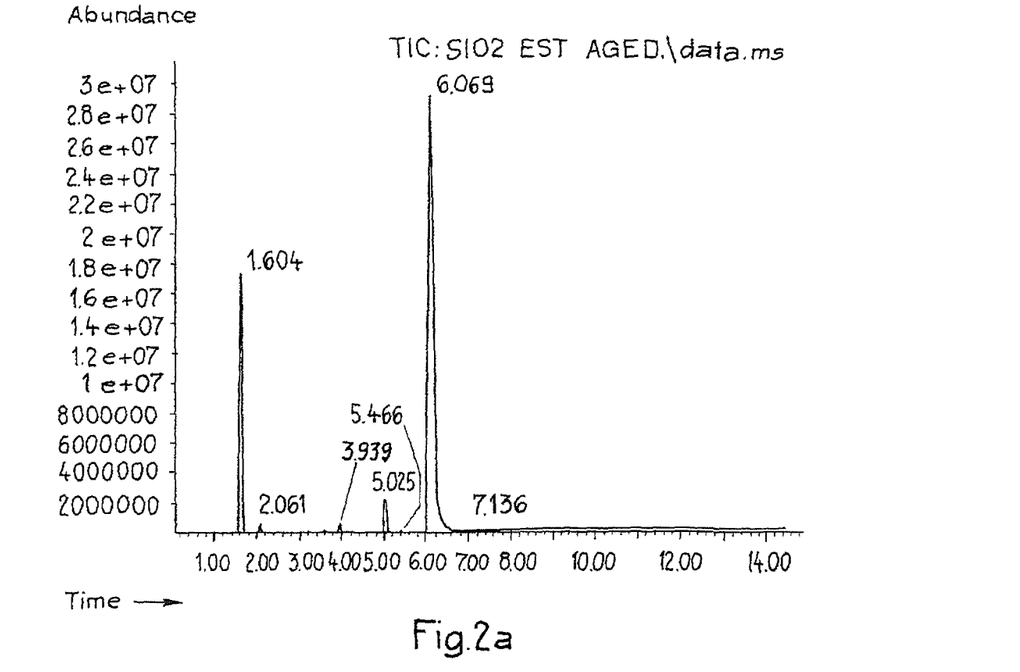
FIG. 2a is a graph illustrating a gas chromatogram (abundance in a.u. versus retention time in minutes) for the gas obtained after exposure to the rubber containing a filler based on silanized silica according to the present invention.
Figure 2B:
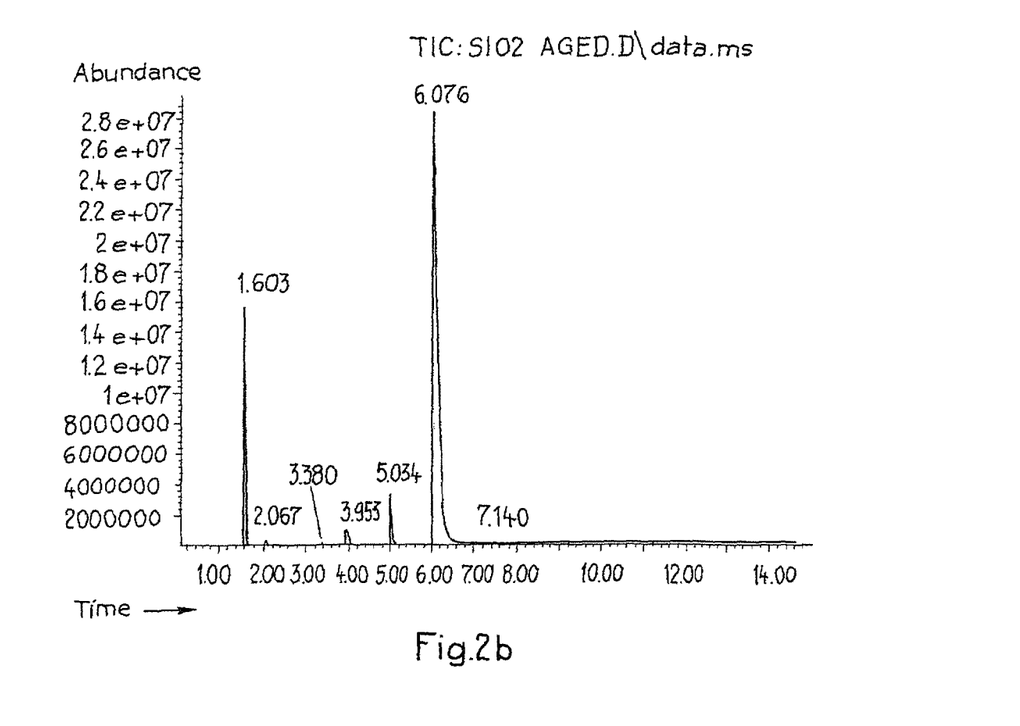
FIG. 2b is a graph illustrating a gas chromatogram (abundance in a.u. versus retention time in minutes) for the gas obtained after exposure to the rubber containing a $SiO_2$ filler according to the comparative sample.

The amount of the two decomposition products hexafluoropropene and heptafluoropropene obtained by the exposure is shown in FIG. 2a relating to a gas chromatogram (abundance in a.u. versus retention time in minutes) for the gas obtained after exposure to the rubber containing a filler based on silanized silica according to the present invention; and FIG. 2b relating to a gas chromatogram (abundance in a.u. versus retention time in minutes) for the gas obtained after exposure to the rubber containing a $SiO_2$ filler according to the comparative sample.

For the sample according to the present invention (FIG. 2a), a total amount heptafluoropropene (retention time: 5.025 minutes) of 0.5 mol-% and a total amount of hexafluoropropene (retention time: 3.939) of 0.06 mol-% have been determined in the gas mixture after exposure.

For the comparative sample (FIG. 2b), a total amount of heptafluoropropene (retention time: 5.034 minutes) of 0.9 mol-% and a total amount of hexafluoropropene (retention time: 3.953 minutes) of 0.15 mol-% have been determined in the gas mixture after exposure.

This application draws priority from unpublished international application PCT/EP2013/070843, the disclosure of which is herewith incorporated literally and in its entirety into this application by reference.

The invention claimed is:

1. Apparatus for the generation, the distribution and/or the usage of electrical energy, said apparatus comprising:

a housing enclosing an insulating space and an electrically conductive part arranged in the insulating space, said insulating space containing a dielectric insulation medium, at least a portion of which being in the form of an insulation gas comprising an organofluorine compound, wherein at least some components of the apparatus that are directly exposed to the insulation gas have a surface and are made of a material which remains unaltered during exposure to the insulation gas for a period of more than 5 years at operational conditions, and at least a portion of the surface is devoid of any nucleophilic group reactive towards the organofluorine compound and/or reactive towards any degradation product of the organofluorine compound at operational conditions, wherein a compound contained on the surface of the at least some components and forming an integral part of the material and/or a compound bound to the surface is or are devoid of a nucleophilic group, and the nucleophilic group is any chemical group that is able to donate in a chemical reaction an electron pair to an electrophile, with the electrophile being the organofluorine compound or its degradation product(s) and the organofluorine compound being selected from the group consisting of: fluoroethers, fluoroketones, fluoroolefins, fluoronitriles, and mixtures thereof, and wherein the compound comprises a coating compound.

2. Apparatus according to claim 1, wherein the at least some components are made of or comprise a polymeric material, a metal, a metal alloy, a ceramic and/or a composite thereof.

3. Apparatus according to claim 1, wherein the at least some components have a surface, at least some of the exposed nucleophilic groups of which surface are functionalized by at least one of chemical treatment plasma treatment and chemical vapour deposition, the portion of the surface thereby being devoid of any nucleophilic group.

4. Apparatus according to claim 1, wherein all of the exposed nucleophilic groups of the surface of the component are functionalized, the surface thereby being devoid of any nucleophilic group.

5. Apparatus for the generation, the distribution and/or the usage of electrical energy, said apparatus comprising:

a housing enclosing an insulating space and an electrically conductive part arranged in the insulating space, said insulating space containing a dielectric insulation medium, at least a portion of which being in the form of an insulation gas comprising an organofluorine compound, wherein at least some components of the apparatus that are directly exposed to the insulation gas have a surface and are made of a material which remains unaltered during exposure to the insulation gas for a period of more than 5 years at operational conditions, and at least a portion of the surface is devoid of any nucleophilic group reactive towards the organofluorine compound and/or reactive towards any degradation product of the organofluorine compound at operational conditions, wherein a compound contained on the surface of the at least some components and forming an integral part of the material and/or a compound bound to the surface is or are devoid of a nucleophilic group, and the nucleophilic group is any chemical group that is able to donate in a chemical reaction an electron pair to an electrophile, with the electrophile being the organofluorine compound or its degradation product(s) and the organofluorine compound being selected from the group consisting of: fluoroethers, fluoroketones, fluoroolefins, fluoronitriles, and mixtures thereof, wherein the at least some of the components are made of or comprise a polymeric material.

6. Apparatus according to claim 5, wherein the polymeric material is selected from the group consisting of silicones, polyolefins, polyethers, polyesters, polyurethanes, polyepoxides, polyamides, polyimides, polyketones, polysulfones, as well as mixtures thereof.

7. Apparatus according to claim 5, wherein the polymeric material comprises at least one plasticizer, the amount and/or the type of the at least one plasticizer being chosen such that it does not exude out of the material when exposed to an organofluorine-containing insulation gas at operational conditions of the apparatus.

8. Apparatus according to claim 7, wherein the amount of plasticizer contained in the polymeric material is less than 10 wt. % based on the total weight of the polymeric material.

9. Apparatus according to claim 7, wherein the plasticizer contained in the polymeric material has a molecular weight higher than 450 g/mol.

10. Apparatus according to claim 5, wherein the total amount of volatile organic compounds having a boiling of less than 400° C. in the polymeric material is less than 1 wt. % based on the total weight of the polymeric material.

11. Apparatus according to claim 5, wherein the polymeric material contains at least one compound selected from the group consisting of: functionalized metal oxide, unfunctionalized metal oxide, functionalized metal hydroxide, unfunctionalized metal hydroxide, or any combination thereof.

12. Apparatus according to claim 5, wherein at least a portion of a metal oxide and/or a metal hydroxide contained in the polymeric material is unfunctionalized, the amount of unfunctionalized metal oxide and/or metal hydroxide being equal to or less than 5 wt. %.

13. Apparatus according to claim 5, wherein the amount of a metal oxide and/or a metal hydroxide contained in the polymeric material is equal to or less than 5 wt. %.

14. Apparatus according to claim 5, wherein the polymeric material containing a filler based on a metal oxide and/or a metal hydroxide, wherein at least a portion of the metal oxide and/or metal hydroxide is functionalized.

15. Apparatus according to claim 1, wherein at least a portion of the surface of the component is hydrophobic.

16. Apparatus according to claim 1, wherein at least a portion of the surface of the component has a contact angle of more than 90° when contacted with water.

17. Apparatus according to claim 1, wherein the insulation medium is an insulation fluid.

18. Apparatus according to claim 1, wherein the organofluorine compound is selected from the group consisting of: hydrofluoromonoethers, perfluoroketones, hydrofluoroolefins, perfluoronitriles, and mixtures thereof.

19. Apparatus according to claim 1, wherein the insulation medium, comprises a fluoroketone containing from four to twelve carbon atoms.

20. Apparatus according to claim 1, wherein the insulation medium, comprises a hydrofluoromonoether containing at least three carbon atoms.

21. Apparatus according to claim 1, wherein the insulation medium comprises air or at least one air component selected from the group consisting of oxygen ($O_2$), nitrogen ($N_2$), carbon dioxide ($CO_2$), and mixtures thereof.

22. Apparatus according to claim 1, wherein the insulation medium comprises carbon dioxide ($CO_2$).

23. Apparatus according to claim 21, wherein the insulation medium comprises carbon dioxide and oxygen.

24. Apparatus according to claim 23, wherein the ratio of the amount of carbon dioxide to the amount of oxygen ranges from 50:50 to 100:1.

25. Apparatus according to claim 1, wherein the insulation medium comprises one or more degradation products of the organofluorine compound.

26. Apparatus according to claim 1, wherein the apparatus is part of a high voltage apparatus, medium voltage apparatus, low voltage apparatus, direct-current apparatus, switchgear, air-insulated switchgear, a component of air-insulated switchgear, gas-insulated metal-encapsulated switchgear (GIS), a component of gas-insulated metal-encapsulated switchgear, gas-insulated transmissionline (GIL), busbar, bushing, gas-insulated cable, cable joint, current transformer, voltage transformer, sensors, humidity sensors, surge arrester, capacitor, inductance, resistor, current limiter, high voltage switch, earthing switch, disconnector, combined disconnector and earthing switch, load-break switch, circuit breaker, gas circuit breaker, gas-insulated vacuum circuit breaker, generator circuit breaker, medium voltage switch, ring main unit, recloser, sectionalizer, low voltage switch, a gas-insulated switch, transformer, distribution transformer, power transformer, tap changer, transformer bushing, electrical rotating machine, generator, motor, drive, semiconducting device, power semiconductor device, power converter, converter station, or convertor building.

27. Apparatus according to claim 1, wherein the at least some of the components of the apparatus that are directly exposed to the insulation gas are made of a material which remains unaltered during exposure to the insulation gas for a period of more than 10 years, at operational conditions of the apparatus.

28. Apparatus according to claim 1, wherein the coating compound is a paint.

29. Apparatus according to claim 28, wherein the coating compound is a powder coating paint.

30. Apparatus according to claim 1, wherein the apparatus is a high voltage apparatus, medium voltage apparatus, low voltage apparatus, direct-current apparatus, switchgear, air-insulated switchgear, part of an air-insulated switchgear, gas-insulated metal-encapsulated switchgear (GIS), part of a gas-insulated metal-encapsulated switchgear, gas-insulated transmissionline (GIL), busbar, bushing, gas-insulated cable, cable joint, current transformer, voltage transformer, sensors, humidity sensors, surge arrester, capacitor, inductance, resistor, current limiter, high voltage switch, earthing switch, disconnector, combined disconnector and earthing switch, load-break switch, circuit breaker, gas circuit breaker, gas-insulated vacuum circuit breaker, generator circuit breaker, medium voltage switch, ring main unit, recloser, sectionalizer, low voltage switch, a gas-insulated switch, transformer, distribution transformer, power transformer, tap changer, transformer bushing, electrical rotating machine, generator, motor, drive, semiconducting device, power semiconductor device, power converter, converter station, or a convertor building.

* * * * *